Figure 3:
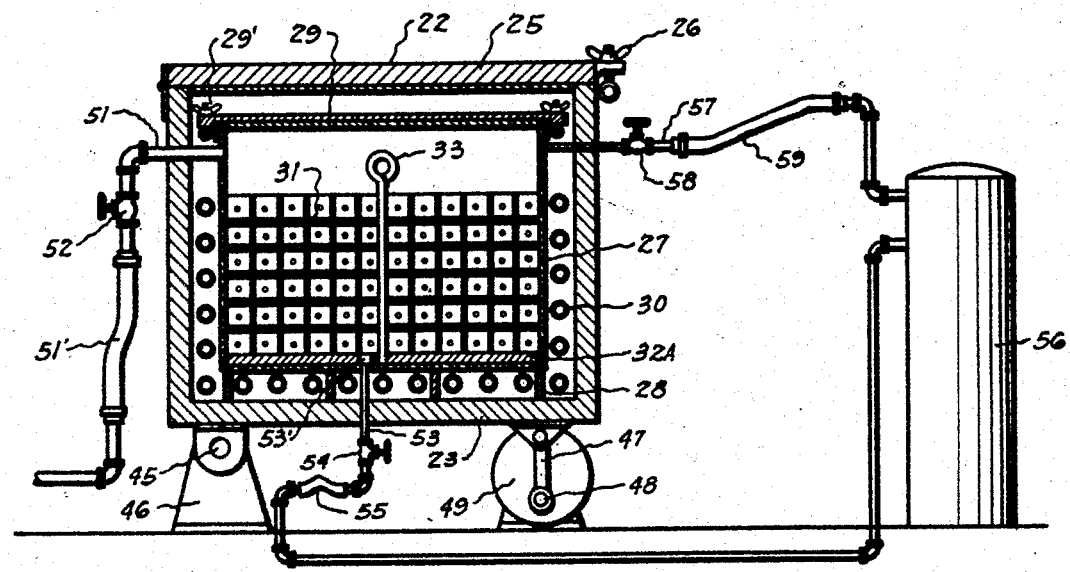

May 6, 1941.　　　　　M. GLAZER　　　　　2,240,769
MEANS FOR MANUFACTURING CARBONATED ICE
Filed Oct. 25, 1937　　　　2 Sheets-Sheet 1
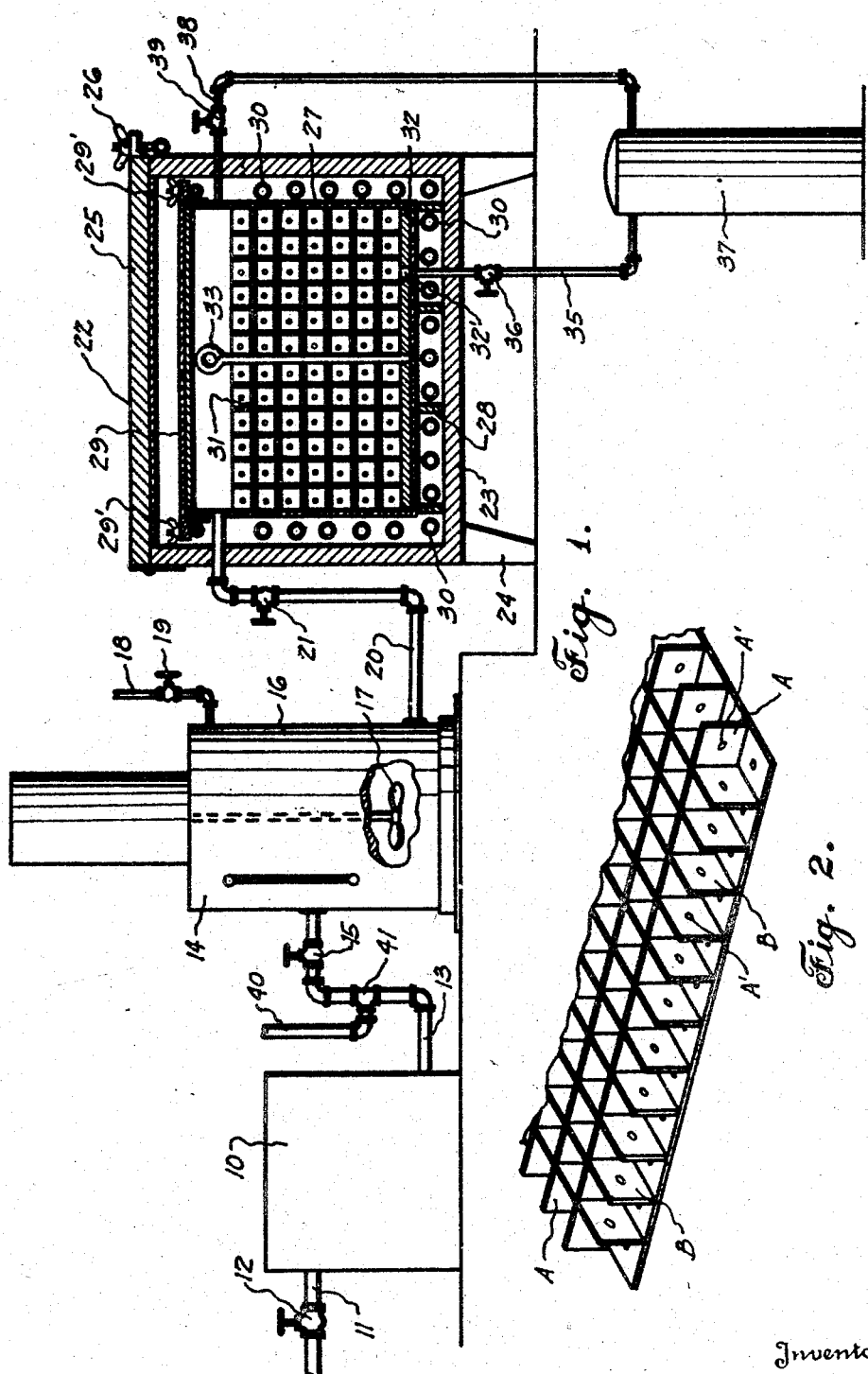
Inventor
Max Glazer
By Jack A. Ashley
Attorney May 6, 1941.  M. GLAZER  2,240,769

MEANS FOR MANUFACTURING CARBONATED ICE

Filed Oct. 25, 1937  2 Sheets-Sheet 2

Inventor
Max Glazer

By Jack A. Ashley
Attorney

Patented May 6, 1941

2,240,769

UNITED STATES PATENT OFFICE 2,240,769

MEANS FOR MANUFACTURING CARBONATED ICE

Max Glazer, Dallas, Tex.

Application October 25, 1937, Serial No. 170,731

7 Claims. (Cl. 62—108)

This invention relates to new and useful improvements in carbonated ice and methods of and means for manufacturing the same.

This application is filed as a continuation-in-part of my copending application, filed October 18, 1937, Serial No. 169,657.

Carbonated beverages, such as ginger ale, soda and the like, have been used extensively as "mixers" with liquors, and similar beverages, to enhance the taste of the latter and to make the same more palatable. The carbonated beverage not only adds to the taste and flavor, but also gives life to the drink. However, when the carbonated beverage is exposed to the atmosphere, it loses its carbonation due to the gas escaping therefrom since the liquid itself does not have the property of holding the gas therein. Therefore, when the carbonated beverage stands in a glass for a period of time and is exposed to the atmosphere, the gas therein escapes to the atmosphere, with the result that the drink becomes "flat" or lifeless, losing its taste and detracting from its flavor. This is true, not only of those carbonated beverages generally known as "mixers" but also occurs in carbonated soft drinks, such as "Coca-Cola," "Root Beer" and the like. It follows then that all carbonated beverages are "alive" and tasty when first poured into a glass or other vessel, but after standing or being dormant for a period of time, they become lifeless or flat, making them undesirable.

The majority, in fact, practically all, of the carbonated beverages, either mixed or otherwise, lack much of their taste and flavor when warm and, therefore, are served cold. This is accomplished by placing ice in the glass or other container, and the drink is thus maintained in a cold state. However, the ice melts and as it does so, it dilutes the drink which, together with the decline of the carbonation in the liquid, causes the drink to become flat. It is obvious that after a drink has stood for a period of time, the ice melts and the carbonated liquid has lost its life through the escape of gas to the atmosphere, the drink becoming practically tasteless and most undesirable.

It is, therefore, one object of the invention to provide improved means for maintaining the life of a carbonated beverage so as to prevent its becoming flat for a relatively long period of time.

An important object of the invention is to provide an improved product consisting of carbonated ice, whereby when the same is added to a carbonated beverage in a glass or other container, said ice, in melting, will add carbonation to the liquid so that so long as ice remains, the beverage will remain in a carbonated state and will not become flat or lifeless.

Another object of the invention is to provide an improved product which is manufactured by freezing water having a gas, such as $CO_2$ therein, whereby the gas is trapped or held within the ice so formed, and is not released until the ice melts.

Still another object of the invention is to provide an improved method of manufacturing ice which consists of, carbonating a liquid, conducting said liquid to a freezing chamber and freezing the same, whereby a carbonated ice is produced; it being possible, if desired, to maintain the carbonated liquid within the freezing chamber under pressure to prevent escape of the carbonating medium from the liquid during the freezing operation.

A particular object of the invention is to provide an improved method of forming carbonated ice cubes, which may be packed and suitably retailed by fountains, stores and the like.

A further object of the invention is to provide an improved method of manufacturing carbonated ice which consists in introducing gas into clear water within a closed container and freezing said water to confine the gas within the ice; said method also contemplating the introduction of Lithia salts, flavoring, or the like, to the water prior to freezing, whereby the ice is flavored or made more palatable when melted.

A construction designed to carry out the invention will be hereinafter described, together with other features of the invention.

Figure 4:
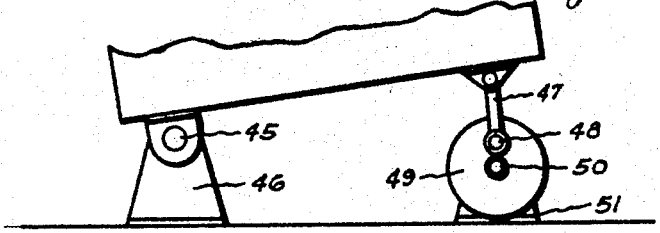
Figure 5:
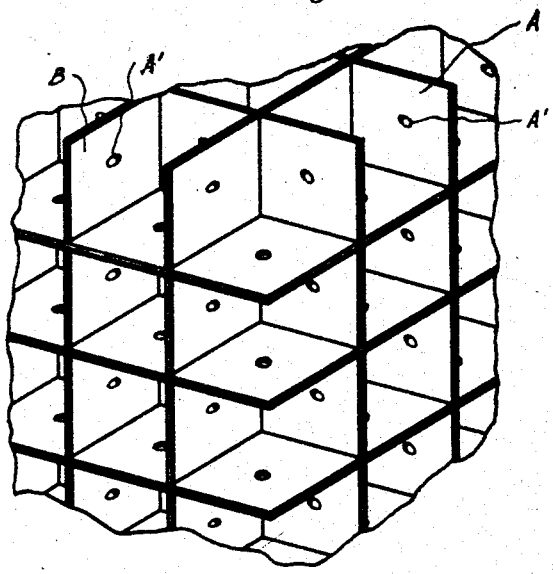

The invention will be more readily understood from a reading of the following specification and by reference to the accompanying drawings, in which an example of the invention is shown, and wherein:

Figure 1 is a view partly in elevation and partly in section, of an apparatus, constructed in accordance with the invention, for manufacturing the improved product, Figure 2 is an isometric view of the transverse partition for forming the ice cubes, Figure 3 is a view, partly in elevation and partly in section, of another form of the device, Figure 4 is an elevation of the lower portion of the casing disclosed in this form, and Figure 5 is an enlarged isometric view of the transverse partition within the casing.

There are various methods by which the improved product may be manufactured, but it is desirable that water without any extraneous substance, such as ammonia be employed. However, if desired, ammonia could be used.

In Figure 1, the numeral 10 designates a housing wherein a suitable cooling device is mounted. A water inlet pipe 11 having a control valve 12 connected therein, leads from a suitable source of water supply and is connected into the housing 10. The water is thus introduced into the cooling unit and is cooled as it passes therethrough. The cooled water escapes from the cooling unit 10 through an outlet pipe 13. This pipe has its opposite end connected to a suitable carbonator 14. A hand valve 15 for controlling the flow through the pipe 13 is connected in said pipe.

The carbonator is of the usual construction and comprises a cylindrical casing 16 which has a rotatable agitator 17 therein. A gas inlet pipe 18 having a control valve 19 connected therein, leads from a source of gas supply to the upper end of the casing 16. The gas is preferably $CO_2$ or other suitable carbonating medium and is introduced into the casing 16 on the side opposite from that at which the pipe 13 is connected to said casing. Thus the cooled water or other liquid to be carbonated enters the casing 16 from one side, while the gas or carbonating medium, enters said casing from the opposite side. The liquid and the gas are admixed within the casing 16 by the action of the rotatable agitator 17 and thus the liquid is carbonated.

The carbonated liquid passes from the carbonating unit 14 through an outlet pipe 20 which leads from the lower end of the casing 16. This pipe has a suitable hand valve 21 connected therein for controlling the flow therethrough. The other end of the pipe 20 beyond the valve 21 extends through the wall of a freezing unit 22. The freezing unit 22 includes a casing 23 which is supported on suitable legs 24. The upper end of the casing is open, being adapted to be closed by a hinged cover 25. A suitable latch 26 secures the cover in place on the casing and it is pointed out that both the cover and the casing are preferably made of heat insulating material.

A metallic container 27 is mounted within the casing 23, being supported on transversely extending bars or supports 28 which rest on the bottom of the casing 23. The upper end of the container 27 is closed by a cover plate 29 suitably fastened thereto by latches 29'. When the cover plate 29 is removed access to the interior of the container 27 may be had. A plurality of cooling coils 30 surround the inner container 27 and are located between the outer wall of said container and the inside wall of the casing 23. The coils 30 are also located between the transverse supporting bars 28 beneath the bottom of the inner container 27. These cooling coils serve to cool the interior of the casing 23 and also cool the inner container 27.

The pipe 20 which leads from the carbonating unit 14 extends through the wall of the casing 23 and is secured in the upper end of the wall of the inner container 27, whereby the liquid which has been carbonated within the unit 14 may be introduced into the interior of the container 27. The cooling coils 30 will, of course, cool the interior of the container, as well as the interior of the casing 23 and therefore the carbonated water introduced into the container 27 will be frozen. The freezing of this water causes the gas to be trapped within the ice so formed, and said gas cannot escape until the ice is melted.

In order to form the ice into cubes within the container 27, it is preferable to form a plurality of compartments within said container. These compartments are formed of a series of transverse partitions, which are superimposed above each other within the container. Each series of partitions are separated by a transversely extending sheet 31, which is preferably constructed of a non-porous paper or similar material. Each series of partitions includes a plurality of partitions A which are suitably secured to partitions B, the latter being disposed at right angles to the partitions A. The lowermost series of partitions rest upon a base plate 32 which is placed within the bottom of the container 27. This plate is preferably constructed of a light wood or metal, while the partitions A and B are preferably formed of a non-porous paper, similar to the sheet 31. With such arrangement, it will be obvious that all of these partitions are supported upon the base plate 32 and when said plate is removed all of the partitions are removed therewith as a unit. To facilitate removal of the base plate, a rod 33 extends downwardly through the separating sheets 31 and has its lower end threaded into the central portion of the base plate 32. The upper end of the rod 33 is formed with a suitable eye or loop, whereby the operator may easily grasp the same.

The operation of the device is obvious. The water or other liquid, is introduced into the cooling unit 10 through the pipe 11 and flows from this unit through the pipe 13, to the carbonator 14. The carbonating medium, such as $CO_2$, is introduced into the carbonator through the pipe 18 and the liquid and said medium are thoroughly admixed to carbonate said liquid. The carbonated liquid flows through the pipe 20 and into the interior of the container 27. It will, of course, flow into the uppermost compartment formed by the upper series of partitions since the pipe 20 is connected into the upper end of the container 27. The separating sheets 31 are formed with a plurality of perforations 31', whereby the carbonated liquid entering the container may flow into all of the compartments. If desired, the partitions A and B may also have perforations A' therein (Figure 5) to aid in evenly distributing the water throughout all of the compartments. After the water has been introduced into the compartments, the cooling coils 30, which cool the interior of both the casing 23 and the container 27, freeze the water.

The gas which is within the carbonated liquid introduced into the container cannot escape therefrom during the freezing operation, because the cover 29 is clamped in position on the container 27, whereby said container is closed to prevent such escape. After the ice is formed by the freezing operation, a plurality of carbonated ice cubes are produced.

To remove these ice cubes from the container 27, it is only necessary to swing the cover 25 upwardly, after which the cover plate 29 is removed by operating the latches 29'. The operator then grasps the rod 33 and lifts the ice cubes from within the container 27. After the cubes are removed from the container, the rod 33 is unscrewed from the base plate 32 and lifted upwardly, whereby it is removed from the cubes. The cubes may then be packed in cartons or packages and stored in a suitable freezing chamber to await disposal to the trade.

It is pointed out that by cooling the liquid prior to its carbonation, said liquid will more readily admix with the carbonating gas. Also when the liquid is cool, it will retain more gas and thereby reduce the possibility of said gas escaping from the liquid before said liquid reaches a frozen state. However, it is pointed out that the cooling unit 10 could be eliminated and the water at a normal temperature introduced into the carbonator.

In order to obviate any danger of the gas escaping from the liquid prior to the freezing of said liquid, a gas line 35 may be connected into the bottom of the container 27. An opening 32' is formed in the base plate 32 above the line 35, whereby the gas flowing through said line may enter the compartment formed within the container 27. The line 35 has a suitable control valve 36 connected therein and leads from a supply tank 37. A similar gas line 38 having a control valve 39 therein has one end connected in the top of the container 27 while its other end is connected to the tank 37. With this arrangement, it will be obvious that when the carbonated liquid is introduced into the compartments of the container 27, and prior to the freezing of this carbonated liquid, the valves 36 and 39 may be opened, whereby additional gas is introduced into the container 27. The pressure of the gas within the container will of course equalize with the pressure within the supply tank 37 and thus the liquid within the compartments of the container 27 will be placed under a pressure, whereby the gas within the liquid in the compartments cannot escape during the freezing of such liquid. In such case, said gas is confined within the liquid and after said liquid is frozen to form ice, the gas is trapped within the ice and cannot escape until the same is melted. It is particularly pointed out that the use of the lines 35 and 38 which place the interior of the container 27 under a gas pressure may be eliminated and are not essential to the carrying out of this invention.

From the foregoing, it will be manifest that the water or other liquid, is first charged or carbonated and is then frozen to form ice. The gas is confined within the ice so formed and cannot be released until the ice is melted. When melted, the gas is released in proportion to such melting and so long as any ice remains, release of the gas continues. Therefore, if the carbonated ice is placed in a liquid, either carbonated or not, the gas from the melting ice charges the liquid or increases the carbonation thereof.

It may be desirable to flavor the carbonated ice in many instances, in which case the water would be flavored by the introduction of a flavoring either before or after carbonation and prior to freezing. This flavoring could be introduced through a pipe 40 which is connected in a T 41 mounted within the pipe 13 which connects the cooling unit 10 to the carbonator 14. However, the flavoring could be introduced into the pipe 20 after the water or other liquid has been charged. When the carbonated ice is flavored, the melted ice would be the equivalent of a carbonated beverage of a particular flavor. The melting ice would not only add carbonation to the drink but would also add flavor and taste thereto to make the same more palatable. In place of flavoring, Lithia salts in a proper amount may be added to the water prior to freezing. The addition of these salts would add sparkle to the carbonated ice, whereby when the same is melted, the resultant liquid would be substantially the equivalent of the carbonated beverages known as "Sparkling water" or "White Rock."

In Figures 3 and 4, a modified form of apparatus for carrying out the improved method is shown. In this form the cooling unit 10, as well as the carbonating unit 14, is eliminated. The freezing unit 22 is mounted at one end on a shaft 45 which is secured in suitable supports 46 mounted on the floor or other base. The opposite end of the casing 23 of the unit is secured to the outer end of a crank arm 47. The opposite end of said arm is eccentrically pivoted at 48 on a cam disk 49. The disk is rotatable on a shaft 50 supported in a suitable bracket 50'. When the disk is rotated, it will be evident that a swinging movement will be imparted to the casing 23 and such movement will agitate the contents to thoroughly admix the water and carbonating medium. The shaft 50 may be rotated by any suitable drive means (not shown).

The interior of the casing 23 as well as the container 27 is substantially the same as that disclosed in the first form. A water inlet pipe 51 is substituted for the pipe 20 and has one end leading from a suitable source of water supply, while its other end is connected in the upper wall of the container 27. A suitable hand control valve 52 is connected in the pipe 51. The pipe 51 also has a flexible connection 51' which compensates for the swinging movement of the casing when the cam disk 49 is operated. A gas inlet pipe 53, similar to the line 35, is connected in the bottom of the container 27 and is alined with an opening 53' formed in the base plate 32A. The pipe 50 is provided with a control valve 54 and a flexible connection 55 and has one end connected to a supply tank 56. When the valve 54 is opened the gas flows through the pipe 53 and enters the interior of the container 27 to admix with the water, or other liquid standing in the compartment within said container. A gas pipe 57 which is substituted for the line 38 leads from the upper end of the container 27 and has its opposite end connected to the supply tank 56. The pipe 57 has a control valve 58 and a flexible hose 59 connected therein.

The operation of this form is somewhat different from the form disclosed in Figure 1. In this instance, the water or other liquid, which is not carbonated, is introduced into the container 27 and enters the compartments formed within said container by the series of partitions supported on the base plate 32A. After the water is introduced into these compartments, the valve 54 is opened to introduce gas into the container 27. This gas passes upwardly through the compartments and contacts the liquid standing therein. This gas admixes with the liquid and carbonates or charges the same. After sufficient gas has been introduced into the liquid, the valve 58 is opened and the pressure within the tank 56 and the container 27 is equalized to prevent escape of the gas admixed with the liquid while said liquid is being frozen. It is pointed out that it would be possible to simultaneously open the control valves 54 and 58 to permit the gas to enter the container 27 from both the pipe 53 and pipe 57, as the results obtained would be the same. In fact, it might be possible to eliminate the pipe 57 and to introduce the gas only through the single pipe 53.

It is pointed out that the liquid to be carbonated and frozen is preferably contained within the substantially air-tight container 27, when the gas is introduced, whereby said gas cannot escape to atmosphere before the freezing of said liquid. However, it is possible to introduce the gas into the liquid which is within an open container as the freezing of said liquid and formation of the ice will occur before all of the gas can escape to atmosphere and this is particularly true when the temperature of the liquid into which the gas is introduced is near the freezing point.

Although a carbonating medium in gaseous form has been described for carbonating the liquid prior to the freezing, it is noted that any medium, such as solidified carbon dioxide may be employed. Also, the invention is not to be limited to the formation of cubes as the carbonated ice may be made in any suitable shape by varying the shape of the receptacle in the freezing chamber.

What I claim and desire to secure by Letters Patent is:

1. A freezing apparatus for freezing a carbonated liquid including, a casing having a closed freezing chamber therein, cooling coils surrounding the chamber, a plurality of superposed shelves each having a plurality of transverse partitions thereon removably mounted within the chamber, and a liquid inlet for introducing carbonated liquid into the chamber and onto said shelves, whereby the liquid is frozen into desired shapes in accordance with the disposition of the partitions and may be removed with the shelves from the chamber.

2. A freezing apparatus for freezing a carbonated liquid including, a casing having a closed freezing chamber therein, cooling coils surrounding the chamber, a plurality of partitions removably mounted within the chamber and arranged to form cubical compartments for receiving liquid to be frozen, and means for conducting a carbonated liquid to the chamber, whereby said liquid is frozen in cubical form and may be removed from the chamber with the partitions.

3. A freezing apparatus for freezing a carbonated liquid including, a casing having a freezing chamber therein, cooling coils surrounding the chamber, a plurality of superposed shelves removably mounted within the chamber, a liquid inlet for introducing carbonated liquid into the chamber and onto said shelves, whereby the liquid is frozen and may be removed with the shelves from the chamber, and means for maintaining the freezing chamber under pressure to prevent escape of the carbonating medium from the liquid during the freezing operation.

4. A freezing apparatus for freezing a carbonated liquid including, a casing having a freezing chamber therein, cooling coils surrounding the chamber, a plurality of partitions removably mounted within the chamber and arranged to form cubical compartments for receiving liquid to be frozen, means for conducting a carbonated liquid to the chamber, whereby said liquid is frozen in cubical form and may be removed from the chamber with the partitions, and means for maintaining the freezing chamber under pressure to prevent escape of the carbonating medium from the liquid during the freezing operation.

5. A freezing apparatus for freezing a carbonated liquid including, a casing having a freezing chamber therein, cooling coils surrounding the chamber, a plurality of superposed shelves each having a plurality of transverse partitions thereon removably mounted within the chamber, a liquid inlet for introducing carbonated liquid into the chamber and onto said shelves, whereby the liquid is frozen into desired shapes in accordance with the disposition of the partitions and may be removed with the shelves from the chamber, and a pressure line connected to the chamber for conducting a carbonating medium under pressure to the chamber to maintain said chamber under a pressure during the freezing operation.

6. A freezing apparatus for freezing a carbonated liquid including, a casing having a freezing chamber therein, cooling coils surrounding the chamber, a plurality of non-porous paper partitions removably mounted within the freezing chamber and forming cubical compartments, and means for conducting a carbonated liquid to the chamber whereby said liquid is frozen in cubical form, the non-porous partitions being frozen within the ice so formed, whereby said partitions may be removed with the ice and packaged therewith.

7. A freezing apparatus for freezing a carbonated liquid including, a casing having a freezing chamber therein, cooling coils surrounding the chamber, means for maintaining the freezing chamber under pressure to prevent escape of the carbonating medium from the liquid during the freezing operation, a plurality of non-porous paper partitions removably mounted within the freezing chamber and forming cubical compartments, and means for conducting a carbonated liquid to the chamber whereby said liquid is frozen in cubical form, the non-porous partitions being frozen within the ice so formed, whereby said partitions may be removed with the ice and packaged therewith.

MAX GLAZER.